United States Patent [19]

Kapsambelis et al.

[11] 3,743,819

[45] July 3, 1973

[54] LABEL READING SYSTEM

[75] Inventors: Christos B. Kapsambelis, Canton; David J. Collins, Duxbury, both of Mass.

[73] Assignee: Computer Identics Corporation, Westwood, Mass.

[22] Filed: Dec. 31, 1970

[21] Appl. No.: 103,159

[52] U.S. Cl.235/61.11 F, 235/61.11 E, 235/61.12 N, 340/146.3 H, 340/146.1 BA

[51] Int. Cl. .. G06k 7/14, G06k 19/06, G06f 11/02, G06k 9/18

[58] Field of Search .............. 235/61.11 R, 61.11 E, 235/61.11 G, 61.7 B, 61.12 N, 61.12 R, 61.11 F; 340/149 A, 146.3 K, 146.3 AH, 146.3 S, 172.5, 146.3 Y; 250/219 D

[56] References Cited

UNITED STATES PATENTS

| | | | |
|---|---|---|---|
| 3,618,017 | 11/1971 | Murayama | 340/146.1 BA |
| 3,525,074 | 8/1970 | Cutaia | 340/146.3 Y |
| 3,295,105 | 12/1966 | Gray | 340/146.3 H |
| 3,273,123 | 9/1966 | Lowitz | 235/61.11 F |
| 3,519,990 | 7/1970 | Holt | 340/146.3 H |
| 3,543,007 | 11/1970 | Brinker | 235/61.11 E |
| 3,316,392 | 4/1967 | Bailey | 235/61.12 N |
| 3,309,667 | 3/1967 | Feissel | 235/61.11 F |
| 3,553,437 | 1/1971 | Boothroyd | 235/61.11 E |
| 3,502,851 | 3/1970 | Kakimoto | 235/61.12 R |
| 2,905,927 | 9/1959 | Reed | 235/61.11 F |
| 3,539,989 | 11/1970 | Hanchett | 235/61.11 F |
| 3,346,853 | 10/1967 | Koster | 340/172.5 |

*Primary Examiner*—Maynard R. Wilbur
*Assistant Examiner*—Robert M. Kilgore
*Attorney*—Iandiorio & Grodberg, Joseph S. Iandiorio, Lester S. Grodberg and Dos T. Hatfield

[57] ABSTRACT

A system is disclosed for processing data from an area of information including at least one field of information including means for accumulating a segment of information derived from a scan of the area, means responsive to the means for accumulating, for detecting whether the segment of information is a valid or invalid field of information, means, responsive to the means for detecting, for determining a first predetermined ratio of number of valid scans to number of invalid scans which represents that a field of information has been scanned, and means responsive to the means for determining for reading out the segment of information.

32 Claims, 10 Drawing Figures

Christos B. Kapsambelis
David J. Collins
INVENTORS.
BY
Joseph S. Iandiorio
ATTORNEY.

Christos B. Kapsambelis
David J. Collins
INVENTORS.
BY
Joseph S. Iandiorio
ATTORNEY.

Christos B. Kapsambelis
David J. Collins
INVENTORS.
BY
Joseph S. Iandiorio
ATTORNEY.

Christos B. Kapsambelis
David J. Collins
INVENTORS.
BY
Joseph S. Iandiorio
ATTORNEY.

Christos B. Kapsambelis
David J. Collins
INVENTORS.

BY

Joseph S. Iandiorio
ATTORNEY.

LABEL READING SYSTEM

FIELD OF INVENTION

This invention relates to a system for processing data received from an area of information which includes at least one field of information, and more particularly to such a system which is capable of determining when a segment of information is a valid segment of information derived from a field of information and when it is an invalid segment of information derived from surrounding regions and which is capable of distinguishing the data received from each separate field of information and from a number of fields of information constituting an area of information.

SUMMARY OF INVENTION

It is an object of this invention to provide an improved system for processing data received from an area of information including at least one field of information such as may be carried by a label or any other object.

It is a further object of this invention to provide such a system which can distinguish between data received from segments of information which are valid fields of information and data received from segments of information which are invalid fields of information, which can determine when a field of information has been completely scanned and which can determine when a plurality of fields of information constituting an area of information have been scanned.

This invention features a system for processing data from an area of information including at least one field of information. There are means for accumulating the segment of information derived from a scan of the area and means responsive to the means for accumulating for detecting whether the segment of information is a valid or an invalid field of information. In addition, there are means, responsive to the means for detecting, for determining a first predetermined ratio of number of valid scans and number of invalid scans which represent that a field of information has been scanned and means, responsive to the means for determining, for reading out the segment of information.

In preferred embodiments, there are means, responsive to the means for accumulating, for comparing a segment of information derived from a scan with a segment derived from a previous scan to indicate that a segment of information has been derived from a field of information and means, responsive to the means for comparing, for conditioning the means for reading out.

DISCLOSURE OF PREFERRED EMBODIMENT

Other objects, features and advantages will occur from the following description of a preferred embodiment and the accompanying drawings, in which.

Figure 1:
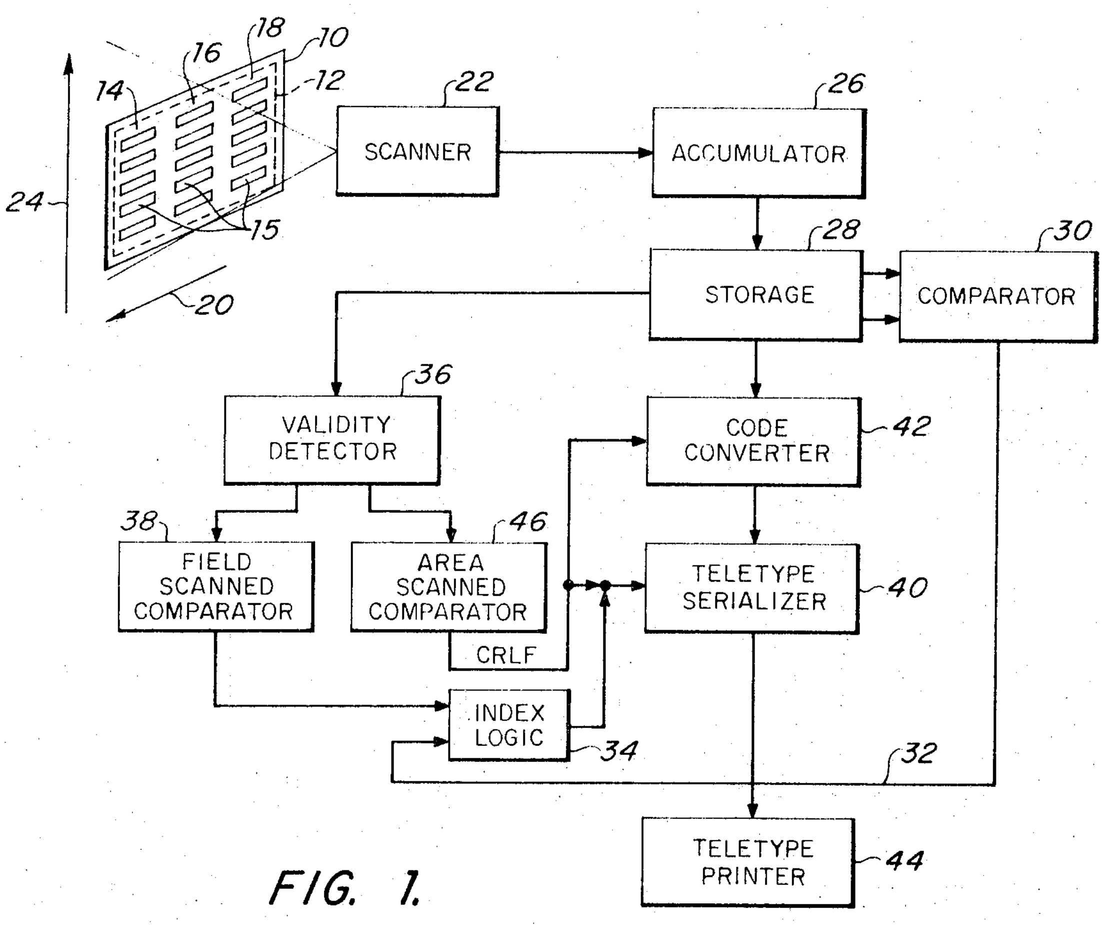
FIG. 1 is a functional block diagram of a system for processing information in accordance with this invention.

There is shown in FIG. 1 a label or card 10 having an area of information 12 including three fields of information, columns 14, 16 and 18, each of which includes a plurality of indicia 15, any one or more of which may have its reflective quality altered with respect to the remainder of the indicia in accordance with some predetermined coding scheme. As the card moves in the direction shown by arrow 20, scanner 22 repeatedly scans card 10 in the vertical direction, as indicated by arrow 24. As a segment of information is derived from a scan, it is delivered by scanner 22 to accumulator 26 where it is temporarily stored until the entire segment of information is received. Then the segment of information is transferred to storage 28. That segment may then be compared with a previously derived segment or following completion of another scan, the subsequently derived segment. The segment with which the originally derived segment is compared, be it previously or subsequently derived, is defined as the sequential segment. A favorable comparison indicating that the same data was received in both segments of information provides an output on line 32 which conditions index logic 34. Concurrently with the operation of comparator 30, the segment of information is delivered to the validity detector 36 which determines from the content of the segment whether that segment is a valid field of information or an invalid field of information. The number of valid fields of information are counted and the number of invalid fields of information are counted. When those two counts reach a predetermined ratio, the field scanned comparator 38 provides a signal to index logic 34 which, when properly conditioned, passes that signal to teletype serializer 40. Upon receipt of that signal, serializer 40 passes the segment of information from storage 28 to code converter 42 and delivers it to an output device such as a teletype printer machine 44. When the counts of valid and invalid fields of information reach a second predetermined ratio, the area scanned comparator 46 provides an output to code converter 42 indicating that an area of information has been scanned and calling for the carriage-return-line-feed (CRLF) code and a second signal to teletype serializer 40 to pass that code to teletype printer 44 and set the printer to begin printing on a new line.

Thus, by counting the number of valid scans and the number of invalid scans, forming a ratio from the count and comparing the ratio to a first and a second predetermined ratio, control signals are generated indicative that an area scan has been completed and that a field scan has been completed.

Figure 2:
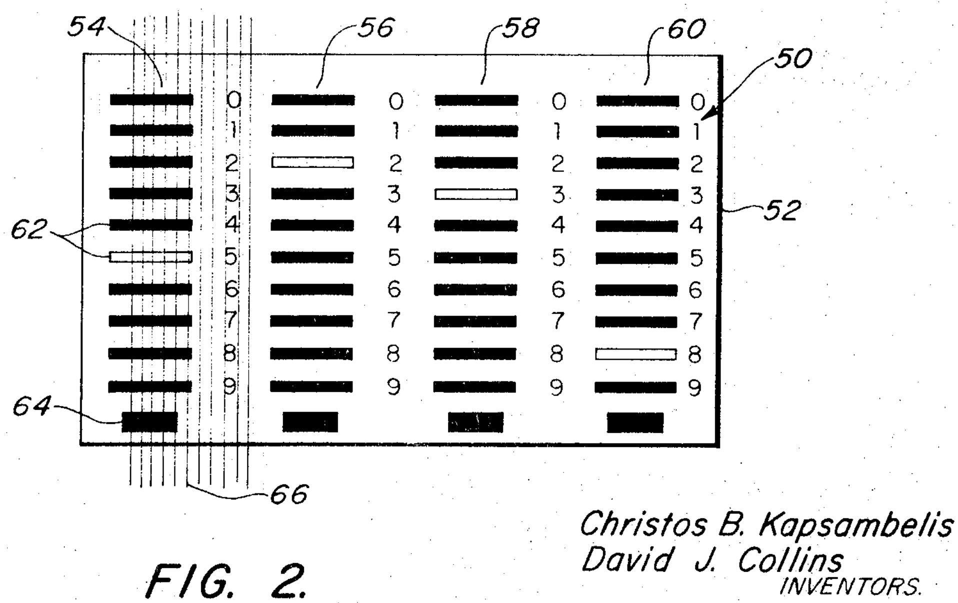
FIG. 2 is a diagram of a card carrying an area of information including four fields of information arranged in columns and usable with the system of this invention.

A typical area of information 50, FIG. 2, carried on card 52 may include four fields of information, columns 54, 56, 58 and 60, each of which contains 10 data indicia 62 and a double width registration indicia 64. In one application, all of the data indicia 62 and registration indicia 64 may be defined by retroreflective media and the numbers zero through nine may be printed at the right of the column, each one associated with a separate one of the indicia 62. Then a human user may code the card by using a grease pencil or the like to obliterate one (and only one) indicia in each column, thereby causing that column to encode the decimal number at the right of the obliterated indicia. In FIG. 2, this has been done so that column 54 represents the decimal number five, column 56 represents the decimal number two, column 58 represents the decimal number three and column 60 represents the decimal number eight. Card 52 is scanned at a rate such that there are a plurality of scans of each column and each space between the columns, as can be seen by the scan lines 66. The columns and spaces are approximately the same width and so are scanned an equal number of times. Registration indicia 64 is narrower than the data indicia 62 to eliminate attempts at recognition of a field derived from the edges of a column where the indicia are most likely to be damaged or incomplete.

Figure 3:
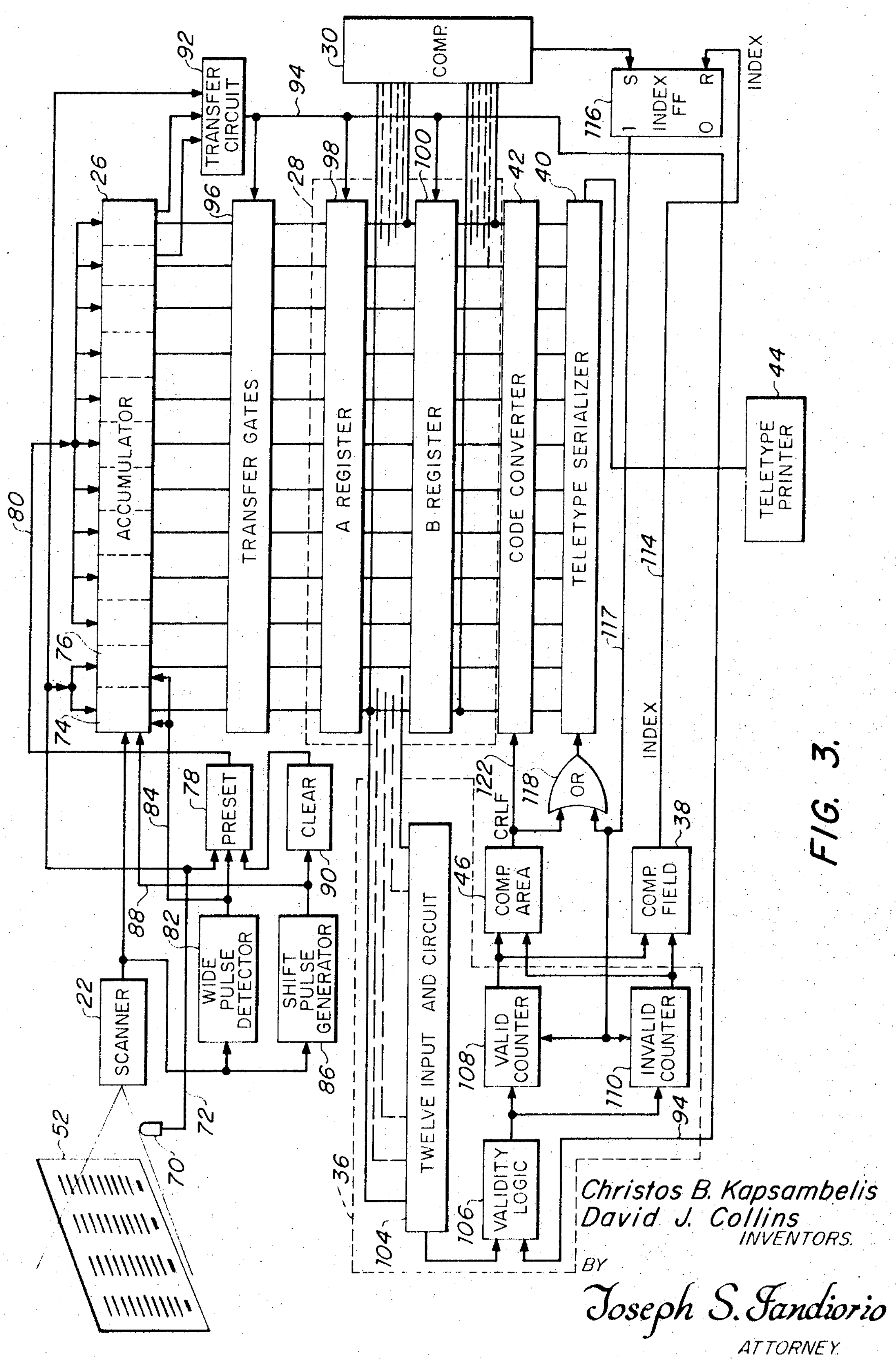
FIG. 3 is a detailed logic block diagram of the system shown in FIG. 1.

As scanner 22 scans card 52, FIG. 3, it provides a series of pulses at its output which are submitted seriatum to twelve stage accumulator 26. Accumulator 26 is provided with twelve stages to accommodate the signals derived from the ten indicia 62 and the double pulse width signal derived from registration indicia 64. Scanner 22 provides a binary one output for each retroreflective indidia and a binary zero for the obliterated indicia and spaces between the indicia. Each time sensor 70 detects the beginning of a scan, a signal on line 72 is sent to the first two stages 74, 76 of accumulator 26 to set a one in each of those stages. That same signal is also delivered to preset circuit 78 which then delivers a signal on line 80 to set a binary one in each of the remaining ten stages of accumulator 26. When a registration indicia 64 is scanned, the pulse produced by scanner 22 is detected by wide pulse detector 82 which then produces a signal on line 84 to set each of the first two stages 74, 76 to contain a zero and delivers a signal to preset circuit 78 to once again set the remaining stages of accumulator 26 to contain one's, thereby insuring that no stage ahead of those containing the wide pulse will contain a binary zero. Each time a pulse appears at the output of scanner 22, shift pulse generator 86 produces a shift pulse on line 88 to shift the information through the stages of accumulator 26. Shift pulse generator 86 also provides that signal to clear circuit 90 which then provides a signal to preset circuit 78 to preset the last ten stages of accumulator 26, if there has been no shift signal for a predetermined prolonged period of time.

When the two zero's in stages 74 and 76, representing registration indicia 64, reach the last two stages of accumulator 26 at the completion of a scan of a field of information, transfer circuit 92 provides an output on line 94 which transfers the information from accumulator 26 in parallel through transfer gates 96 to A register 98 in storage 28 and that same signal on line 94 transfers the contents of A register 98 into B register 100, also included in storage 28 and makes the information stored in B register 100 available to code converter 42. Transfer gates 96 contain twelve separate stages, as does A register 98 and B register 100. A signal on line 94 is also produced by transfer circuit 92 upon a scan begin signal from sensor 70 on line 72 in the event that the previous scan did not result in presentation to accumulator 26 of a segment of information which places binary zero's in each of the last two stages of accumulator 26, indicative of an invalid scan.

Concurrently, the segment of information in A register 98 is received in the twelve input AND circuit 104 included in the validity detector 36. If all 12 inputs to AND circuit 104 are binary one's, the segment of information in A register 98 is interpreted as an invalid field of information by validity logic 106 when it is enabled on line 94 by transfer circuit 92. Conversely, if any one of the twelve inputs to AND circuit 104 is not a binary one, then validity logic 106 interprets that a valid field of information is contained in A register 98 at the time the signal on line 94 appears. A count on the valid fields of information is kept by counter 108 and a count of the invalid fields of information is kept by counter 110 in response to the output of validity logic 106. The counters 108 and 110 are reset at the beginning of each new field scan sequence, as will be explained in more detail infra. Comparator 38 monitors counters 108 and 110 and when their counts reach a predetermined ratio, comparator 38 provides an output on line 114 to reset index flip-flop 116.

When the next segment of information is received in accumulator 26, a new signal is presented on line 94 by transfer circuit 92 and that next segment of information is transferred into A register 98 while the first segment of information is transferred from A register 98 to B register 100. Comparator 30 now receives in parallel the segments of information in A register 98 and B register 100 and makes a comparison of the two segments. If the two segments are the same, comparator 30 provides an output to set flip-flop 116 which then produces a signal at its one output on line 117 to OR ciruit 118. That signal is passed by OR circuit 118 to teletype serializer 40, causing it to serialize the segment of information in B register 100 available at code converter 42. Consistency between that next segment of information in A register 98 and the first segment of information in B register 100 is interpreted by the system as an indication that a true field of information is being scanned and that the information in B register 100 is the same segment of information.

The predetermined ratio to which comparator 38 is to respond is selected in accordance with the size and spacing of the fields of information and the spaces between them. For example, the area of information 50, FIG. 2, contains fields, columns 54, 56, 58, 60, separated by spaces approximately equal to the width of the columns themselves. Thus, if any particular column is scanned ten times on an average, the space between the columns will also be scanned at an average of approximately ten times. Thus, when five invalid scans have been counted, the scanner is viewing at approximately the center of the space between two of the columns. Therefore, if comparator 38 is set to respond when the invalid scans reach one-half the number of valid scans, it will produce an output on line 114 to reset index flip-flop 116 approximately mid-way between two columns in preparation for the beginning of the scan of the next column. Similarly, if the number of invalid scans reaches some number greater than the number of valid scans produced by a column, for example, twice the number of valid scans, it may safely be assumed that the spacing between succeeding columns has been exceeded and that there are no more columns: that the scan of an area of information has been completed.

Thus, comparator 46 may be set to respond when the number of invalid scans reaches two or three times the number of valid scans, whereupon it provides a carriege-return-line-feed signal (CRLF) on line 122 to code converter 42 which converts that to an instruction for the teletype equipment. The signal on line 122 is simultaneously delivered to OR circuit 118 to cause teletype serializer 40 to submit the carriage-return-line-feed instruction code to teletype printer 44.

Figure 4:
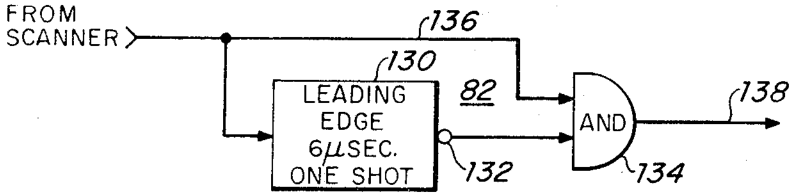
FIG. 4 is a more detailed diagram of the wide pulse detector shown in FIG. 3.

Wide pulse detector 82, FIG. 4, may include a leading edge 6 microsecond one shot circuit 130 which provides an output for 6 microseconds following the leading edge of a pulse from scanner 22. During that 6 microseconds, pulse inverter 132 provides a zero output to AND circuit 134. At the end of the 6 microsecond interval when the output of one shot circuit 130 is removed, inverter 132 provides a one input to circuit 134 which, if the signal from scanner 22 is still present on line 136, provides an output on line 138 indicating that a wide pulse is presently being scanned by the scanner.

Figure 5:
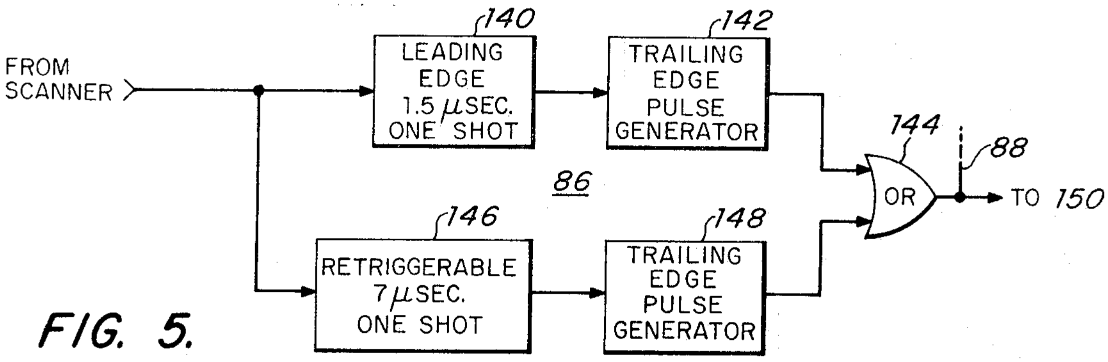
FIG. 5 is a more detailed diagram of the shift pulse generator shown in FIG. 3.

Shift generator 86, FIG. 5, includes a leading edge 1.5 microsecond one shot circuit 140 which provides a signal to trailing edge pulse generator 142 for 1.5 microseconds following the leading edge of a signal from scanner 22. At the end of the pulse from one shot circuit 140, trailing edge pulse generator 142 generates a pulse which appears on line 88 after passing through OR circuit 144. Shift generator 86 also includes in this embodiment a retriggerable 7 microsecond one shot 146 which provides a signal to trailing edge pulse generator 148 for 7 microseconds following the leading edge of each signal from scanner 22. Thus, providing that the pulses from scanner 22 continue with less than 7 microseconds between them, there will be a constant input signal provided at trailing edge pulse generator 148. If the input signal is absent for more than 7 microseconds, then one shot circuit 146 ceases to provide a signal to trailing edge pulse generator 148 which then generates a signal on line 88 through OR circuit 144. This action of circuits 146 and 148 provides a means whereby a shift pulse is provided to maintain the timing of the system even though a pulse from scanner 22 is not present, as occurs when one or more of the indicia 62 are obliterated in accordance with a preselected coding scheme.

Figure 6:
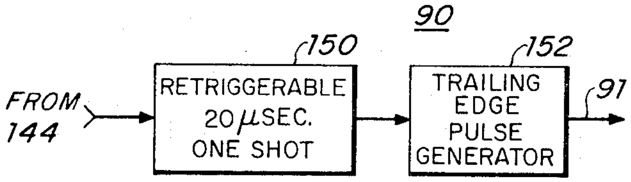
FIG. 6 is a more detailed diagram of the clear circuit shown in FIG. 3.

Clear circuit 90, FIG. 6, includes a retriggerable 20 microsecond one shot circuit 150 which is retriggered each time a shift signal appears on line 88 and stays triggered for twenty microseconds after each such shift signal occurs. Thus, as long as at least one shift pulse occurs every 20 microseconds, one shot circuit 150 remains triggered and output will be provided at the trailing edge generator 152 and there will be no clear signal on line 91. However, if no shift pulse occurs for more than 20 microseconds, one shot circuit 150 will shut down and trailing edge generator 152 will produce a signal on line 91 at the trailing edge of the signal from one shot circuit 150. That signal will be passed by preset circuit 78 to reset the last ten stages of accumulator 26 to contain a binary one.

Figure 7:
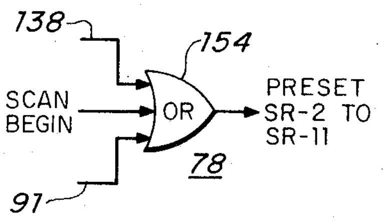
FIG. 7 is a more detailed diagram of the preset circuit shown in FIG. 3.

Preset circuit 78, FIG. 7, contains an OR circuit 154 which has three inputs, one from wide pulse detector 82, one from sensor 70 and one from clear circuit 90 and provides one output to the set input of the last ten stages of accumulator 26.

Figure 8:
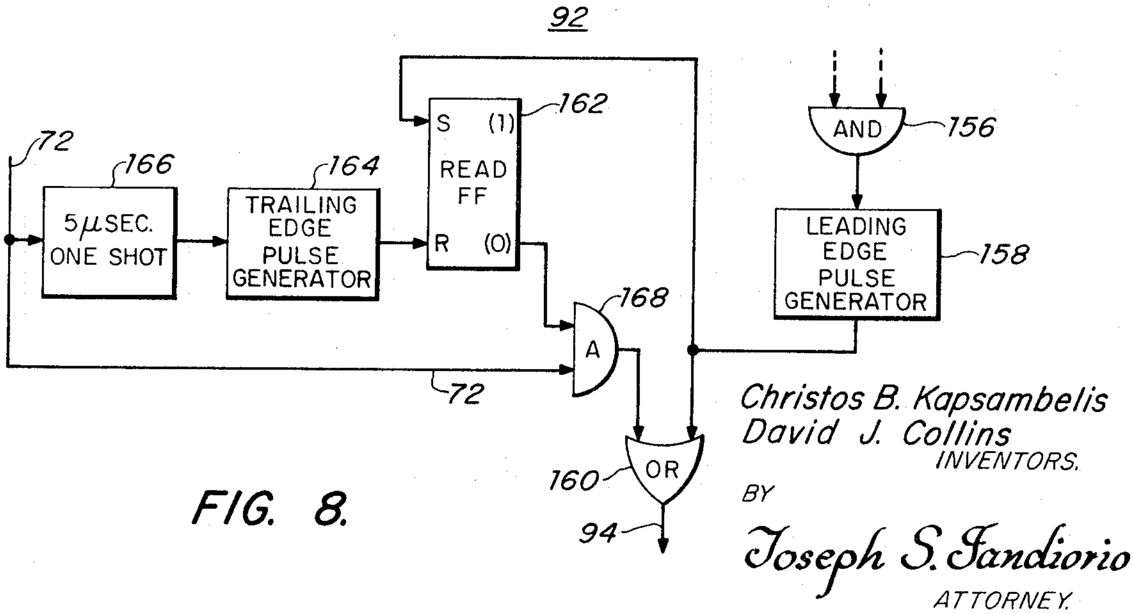
FIG. 8 is a more detailed diagram of the transfer circuit shown in FIG. 3.

Transfer circuit 92, FIG. 8, includes a two input AND circuit 156 connected to the last two stages of accumulator 26 such that when both those stages contain a binary zero, AND circuit 156 provides an output to leading edge pulse generator 158 which in turn provides a signal through OR circuit 160 to line 94 and to the set input of read flip-flop 162. Read flip-flop 162 is reset by a signal from trailing edge pulse generator 164 when the signal from five microsecond one shot circuit 166 ceases 5 microseconds after the receipt of the leading edge of the scan-begin signal on line 72 from sensor 70. The zero output of read flip-flop 162 provides one input to AND circuit 168. The other input is the scanbegin signal on line 72. But if both signals are present, AND circuit 168 provides a signal on line 94 to OR circuit 160 to cause the transfer of segments of information. Thus, a transfer signal on line 94 may be generated either by the presence of binary zero's in each of the last two stages of accumulator 26, or by a scan-begin signal when the previous scan provided a segment of information in accumulator 26 which did not possess binary zero's in each of the last two stages of accumulator 26.

When the two zero's, apparently representing a registration indicia 64, reach the last two stages of accumulator 26 and apparently a segment of information from a field of information is present in accumulator 26, that segment of information will be transferred by means of AND circuit 156 to leading edge pulse generator 158 and OR gate 160 with its integrity preserved. Read flip-flop 162, trailing edge pulse generator 164, five microsecond one shot circuit 166 and AND circuit 168 function to transfer a segment of information in accumulator 26 even though it does not contain a binary zero in each of the last two stages of accumulator 26, indicative of a valid field of information because every segment of information, even those suspected of being invalid fields of information, are essential to the operation of the field scanned and area scanned portions of the system.

This is demonstrated by a sequence of operation of transfer circuit 92. Each time scanner 22 initiates a scan, a scan-begin signal appears on line 72. That signal sets five microsecond one shot circuit 166 and appears momentarily at one input of AND circuit 168. After 5 microseconds, the output of one shot circuit 166 decreases and trailing edge pulse generator 164 then produces an output to reset flip-flop 162 which causes the binary zero output of flip-flop 162 to provide one input to AND circuit 168 after the original scan-begin signal has disappeared on line 72. The system then functions as described until binary zero's appear in each of the last two stages of accumulator 26. When this occurs AND circuit 156 and leading edge pulse generator 158 produce a transfer signal on line 94 to OR circuit 160 and also provide an input to set read flip-flop 162 removing the input to AND circuit 168. Thus, the next scan-begin signal, when it arrives on line 72 at AND circuit 168, will find AND circuit 168 disabled because it lacks an input from the zero output of flip-flop 162. However, if there were, in fact, not a binary zero in each of the last two stages of accumulator 26, no transfer pulse would appear on line 94 and read flip-flop 162 would remain in the reset condition providing an output from its zero output to AND circuit 168. Then, at the beginning of the next scan, when a scan-begin signal appeared on line 72 and was submitted to one input of AND circuit 168, AND circuit 168 would be enabled and provide a transfer pulse on line 94.

Figure 9:
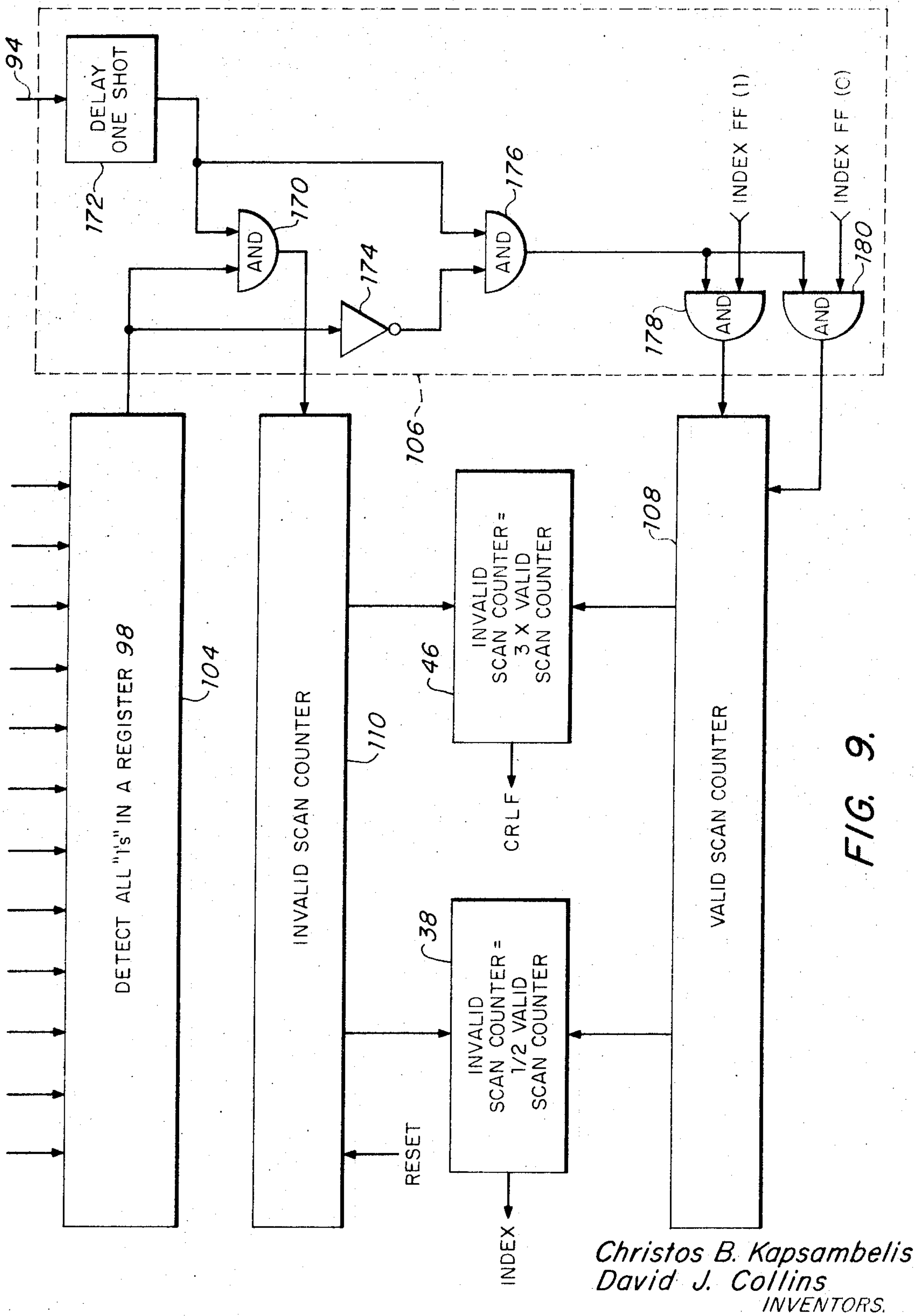
FIG. 9 is a more detailed diagram of the validity logic circuit shown in FIG. 3.

Validity logic 106, FIG. 9, includes an AND circuit 170 which receives one input from twelve input AND circuit 104 when AND circuit 104 detects all one's and receives a second input from delay one shot circuit 172 shortly after a transfer pulse appears on line 94. When both those pulses are present, AND circuit 170 provides an input to invalid counter 110, indicating that the segment of information is not a valid field of information. A second output from twelve input AND circuit 104 is submitted to inverter 174 which provides one input to AND circuit 176 if one or more of the inputs to AND circuit 104 are not a one. The other input to AND circuit 176 is received from delay one shot circuit 172 a short time after a transfer pulse appears on line 94. When AND circuit 176 receives both its inputs, it supplies an output to one of the inputs to each of AND circuits 178 and 180. AND circuit 178 will provide an input to valid counter 108, indicating that the segment of information was a valid field of information when its second input is provided with a one from index flip-flop 116, indicating that a positive comparison has been made by comparator 30. AND circuit 180 will provide an input setting valid counter 108 to one, indicating that the segment of information is a valid field of information when its second input from index flip-flop 116 indicates that favorable comparison has not yet been made by comparator 30. Thus, the function of AND circuits 178 and 180 is to insure that the first valid scan of a series is able to be counted by valid counter 108 by means of AND circuit enabled by index flip-flop 116 which has not yet been set by a favorable comparison and that succeeding segments of information which are valid fields of information will be counted by valid scan counter 108 by means of AND circuit 178 enabled by index flip-flop 116 after it has been set by a favorable comparison appearing in comparator 30.

Figure 10:
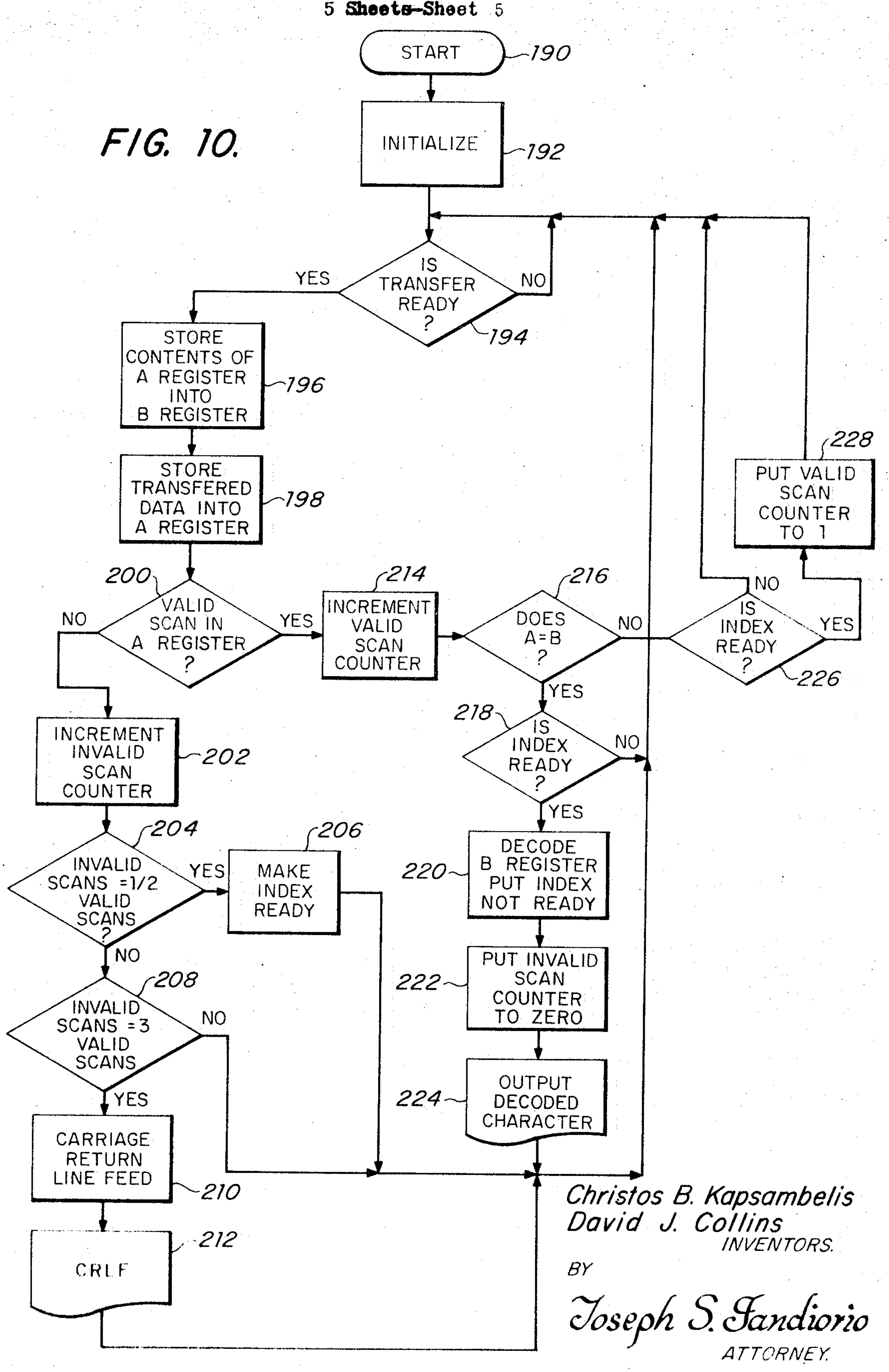
FIG. 10 is a flow chart of a program which may be used in a general purpose digital computer to cause that computer to function in accordance with the system of this invention.

The operation of the system according to this invention, as described previously in FIGS. 1 through 9, with reference to the special purpose computer of FIGS. 1 through 9, may be performed by a general purpose digital computer, properly programmed, as indicated by the flow chart diagram of FIG. 10. After the start 190 and initialized 192 steps, a transfer-ready 194 inquiry is made. If the response is no, the system is cycled back to make the transfer-ready inquiry again. If the response is yes, the next step 196 is to store the contents of the A register into the B register. The next step 198 instructs that the new segment of information be transferred into the A register and in the next step 200 the inquiry is made as to whether a valid scan is present in the A register. If then, the response is yes, the next step 214 is to increment the valid scan counter. If the response is no, the next step 202 is to increment the invalid scan counter. Following incrementing the invalid scan counter, a comparison is made, step 204, to determine whether the number of invalid scans is equal to one-half the number of valid scans. If the response is yes, the next step 206 is to make the index ready. When the index has been made ready the sysem is recycled back to the transfer-ready step 194. If the response to step 204 is no, a further comparison step 208 is made to determine whether the number of invalid scans is equal to three times the number of valid scans. If the answer is no, the system is recycled back to transfer-ready step 194. If the answer is yes, the next step 210 instructs execution of the carriage return line feed. Following this, in step 212, the carriage-return-line-feed instruction is executed, and following step 212 the system is cycled back to the transfer-ready step 194.

At step 198 the inquiry was made to determine whether a valid scan is present in the A register. If the response is affirmative, the next step 214 is to increment the valid scan counter. Following step 214 a comparison step 216 is made to determine whether the contents of the A register are equal to the contents of the B register. If the response is affirmative, the next inquiry made at step 218 determines whether the index is ready. If the index is not ready, the system is cycled back to transfer ready step 194. If the index is ready, the next step 220 is to decode the contents of the B register and to put index not ready. Following this, step 222, the instruction is to put invalid scan counter to zero and then, in step 224, to output the decoded character. Following the output of the decoded character, the system is cycled back to the transfer-ready step 194. If the response to the comparison made in step 216 is negative, the next step 226 is to make the inquiry: Is the index ready? If the response is negative, the system is cycled back to the transfer-ready step 194. If the response is affirmative, the next step 228 is to put valid scan counter to one and then to cycle back to transfer-ready step 194. Thus, the flow chart of FIG. 10 accomplishes the same system function as the system described in FIGS. 1 through 9.

Other embodiments will occur to those skilled in the art and are within the following claims:

What is claimed is:

1. A system for processing data from an area of information, including at least one field of information having a predetermined format, in which a number of scans is made of each field to produce a corresponding number of segments of informa-tion comprising:

means for accumulating said segments of information;

means for detecting whether each said segment of information is a valid segment derived from a field of information having said predetermined format or invalid segment not derived from a field of information having said predetermined format;

first counter means for counting the number of valid segments detected;

second counter means for counting the number of invalid segments detected; and first comparator means for determining whether a predetermined ratio of the number of valid segments to the number of invalid segments has been reached representing that the scanning of a field has been completed.

2. The system of claim 1 in which a said field of information includes a plurality of indicia, one or more of which may have a reflective property altered to distinguish from the remaining indicia in accordance with a preselected coding scheme.

3. The system of claim 2 in which said coding scheme requires one of the indicia to differ from all the rest of the indicia in that field.

4. The system of claim 2 in which said field of information includes a registration indicia at one end of the field.

5. The system of claim 4 in which said indicia are arranged in a line with a predetermined space between each pair of indicia.

6. The system of claim 5 in which said area of information includes a plurality of such fields arranged in juxtaposition with a predetermined space between the fields.

7. The system of claim 1 in which said means for accumulating includes a first register.

8. The system of claim 1 in which said means for detecting includes a multiple input conjunctive logic circuit.

9. The system of claim 4 further including first means for setting predetermined stages of said accumulator to a first condition and the remaining stages to a second condition in response to the scanning of a registration indicia.

10. The system of claim 4 further including a shift pulse generator for providing a shift signal to said accumulator in response to the scanning of an indicium.

11. The system of claim 10 in which said shift pulse generator includes means for providing substitute shift signals in the absence of a predetermined number of indicia according to a preselected coding scheme.

12. The system of claim 11 further including clearing means for resetting said accumulator upon the absence of a shift signal for a predetermined period.

13. The system of claim 1 further including means for comparing a segment of information produced by a scan with a segment produced by a sequential scan to determine whether the segments are the same; and means for indicating that those segments are derived from a field of information when those segments are the same.

14. The system of claim 13 further including second comparator means, responsive to said first and second counter means, for determining that a second predetermined ratio of the number of valid segments to the number of invalid segments has been reached representing that an area of information has been scanned.

15. A method of processing data included in an area of information, having at least one field of information having a predetermined format, in which each field of information is scanned a number of times to produce a corresponding number of segments of information comprising:

accumulating said segments of information;

detecting whether each said segment of information is a valid segment derived from a field of information having said predetermined format or an invalid segment not derived from a field of information having said predetermined format;

counting the number of valid segments detected;

counting the number of invalid segments detected; and determining whether a predetermined ratio of valid segments to invalid segments has been reached representing that the scanning of a field has been completed.

16. The method of claim 15 further including comparing a segment of information produced by a scan with a segment of information produced by a sequential scan to determine whether the segments are the same; and indicating that those segments are derived from a field of information when those segments are the same.

17. A system for processing data from an area of information, including at least one field of information having a predetermined format, in which a number of scans is made of each field of information to produce a corresponding number of segments of information comprising:

first storage means for storing a segment of information;

second storage means for storing a sequential segment of information;

means for comparing the segment in said first storage means with the segment in said second storage means to determine whether they are the same; and means for indicating that those segments are derived from a field of information when those segments are the same.

18. A system for processing data from an area of information, including a number of separate fields of information having a predetermined format and being uniformly spaced from each other, in which a number of scans is made of each field of information to produce a corresponding number of segments of information comprising:

means for accumulating said segments of information;

first storage means for storing a segment of information;

second storage means for storing a sequential segment of information;

transfer means for transferring a segment of information from said means for accumulating to said first storage means and from said first storage means to said second storage means after completion of a scan;

means for comparing a segment of information produced by a scan with a segment produced by a sequential scan to determine whether the segments are the same;

means for indicating that those segments are derived from the field of information when those segments are the same;

means, responsive to said means for comparing, for conditioning said means for reading out to read out the selected segment of information from one of said storage means upon receipt of an enabling signal;

means for detecting whether each said segment of information is a valid segment derived from a field of information having said predetermined format or an invalid segment not derived from the field of information having the predetermined format;

first counter means for counting the number of valid segments detected;

second counter means for counting the number of invalid segments detected; and first comparator means for determining whether a predetermined ratio of the number of valid segments to the number of invalid segments has been reached representing that the scanning of the field has been completed and for providing an enabling signal to said means for reading out.

19. The system of claim 18 further including second comparator means responsive to said first and second counter means for determining that a second predetermined ratio of number of valid to number of invalid segments has been reached representing that an area has been scanned.

20. The system of claim 19 in which a said field of information includes a plurality of indicia, one or more of which may have a reflecting property altered to distinguish from the remaining indicia in accordance with a preselected coding scheme.

21. The system of claim 19 in which said coding scheme requires one of the indicia to differ from all the rest of the indicia in that field.

22. The system of claim 19 in which said field of information includes a registration indicia at one end of the field.

23. The system of claim 19 in which said indicia are arranged in a line with a predetermined space between each pair of indicia.

24. The system of claim 19 in which said area of information includes a plurality of such fields arranged in juxtaposition with a predetermined space between the fields.

25. The system of claim 19 in which said means for accumulating includes a first register.

26. The system of claim 19 in which said means for detecting includes a multiple input conjunctive logic circuit.

27. The system of claim 18 further including first means for setting predetermined stages of said accumulator to a first condition and the remaining stages to a second condition in response to the scanning of a registration indicia.

28. The system of claim 18 further including a shift pulse generator for providing a shift signal to said accumulator in response to the scanning of an indicium.

29. The system of claim 28 in which said shift pulse generator includes means for providing substitute shift signals in the absence of a predetermined number of indicia according to a preselected coding scheme.

30. The system of claim 29 further including clearing means for resetting said accumulator upon the absence of a shift signal for a predetermined period.

31. A method of processing data, included in an area of information including a number of separate fields of information having a predetermined format and being uniformly spaced from each other, in which each field of information is scanned a number of times to produce a corresponding number of segments of information comprising:

accumulating each segment of information;

storing a segment of information;

storing a sequential segment of information;

comparing a segment of information with a sequential segment of information to determine whether the segments are the same;

indicating that those segments are derived from a field of information when those segments are the same;

conditioning the reading out of a segment on the indication that those segments are the same;

detecting whether each said segment of information is a valid segment derived from a field of information having said predetermined format or invalid segment not derived from a field of information having said predetermined format;

counting the number of valid segments;

counting the number of invalid segments;

determining whether a predetermined ratio of the number of valid segments to the number of invalid segments has been reached representing that the scanning of a field has been completed; and providing a signal to read out one of the stored segments of information upon a determination that the predetermined ratio has been reached upon the condition that the scanning of a field has been completed.

32. The method of claim 31 further including determining if a second predetermined ratio of the number of valid segments to the number of invalid segments has been reached representing that the scanning of an area has been completed.

* * * * *